(No Model.)
K. BÖS.
CULINARY UTENSIL.
No. 576,393. Patented Feb. 2, 1897.
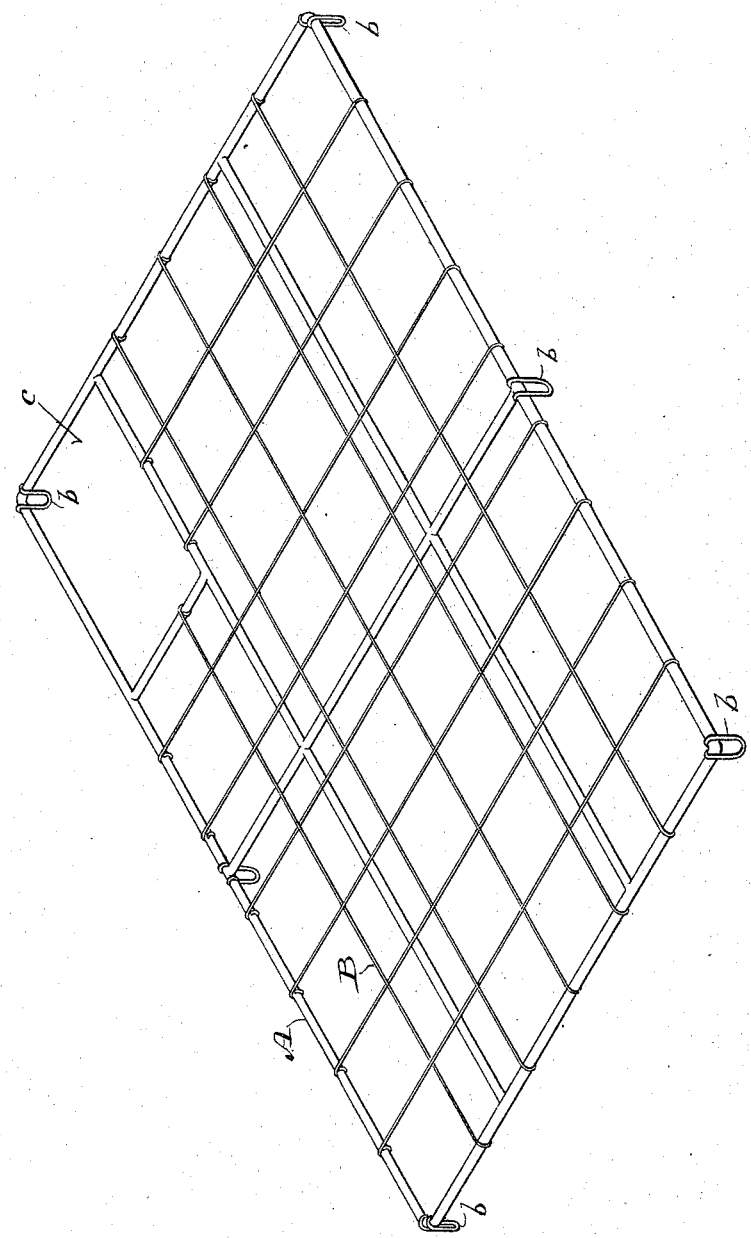

UNITED STATES PATENT OFFICE.

KARL BÖS, OF MILWAUKEE, WISCONSIN.

CULINARY UTENSIL.

SPECIFICATION forming part of Letters Patent No. 576,393, dated February 2, 1897.

Application filed November 30, 1896. Serial No. 613,886. (No model.)

*To all whom it may concern:*

Be it known that I, KARL BÖS, a citizen of the United States, and a resident of Milwaukee, in the county of Milwaukee and State of Wisconsin, have invented certain new and useful Improvements in Culinary Utensils; and I do hereby declare that the following is a full, clear, and exact description thereof.

My invention has for its object to provide a simple economical utensil for use in connection with a bake pan or pot as a means for preventing material therein from scorching or burning, the same being so organized as to permit the use of a spoon for taking up drippings accumulating in the pan, these drippings being employed to baste meat or poultry on said utensil.

In view of the foregoing the invention consists in certain structural peculiarities hereinafter set forth with reference to the accompanying drawing and subsequently claimed.

The drawing represents a perspective view of one form of my invention, and referring by letter to said drawing, A represents a rectangular frame made from course stiff wire and provided with legs b, that may also be of wire, as herein shown. The frame is covered with a web B of woven wire made fast thereto, the strands of this web being considerably finer in the matter of gage than the frame-wire, and while the rack comprising said frame and web is herein shown of rectangular contour it may be as readily made circular or otherwise in conformity to the shape of the pan or pot in which it is to be utilized.

The frame A in any form of rack has sufficient rigidity to sustain the weight of material placed on the covering-web B of woven wire, and while wire is preferable as the material for forming the rack the latter may be made of other suitable material sufficiently perforate to permit drip of juices from meat or poultry to the bottom of the pan or pot in which said rack is utilized.

The rack herein shown is provided with an uncovered aperture c at one corner sufficient in area through which a spoon may be inserted to take up basting-drip from the bottom of a pan in which said rack is employed as a support for meat or poultry, and the rack in any form is to be provided with a similar aperture. The rack being set on its legs in a bake pan or pot, it forms an elevated support for the material to be cooked and thus prevents scorching or burning of the under side of said material.

Having thus described my invention, what I claim as new, and desire to secure by Letters Patent, is—

1. A culinary utensil consisting of an open-work rack provided with legs and a spoon-aperture, said rack being proportioned to set within a pan or pot as a support for material to be cooked.

2. A culinary utensil consisting of a stiff wire frame, and a web of woven wire made fast to the frame to cover all but so much of the same as will permit the use of a basting-spoon in a pan or pot containing the rack, the latter serving as a support for material to be cooked.

In testimony that I claim the foregoing I have hereunto set my hand, at Milwaukee, in the county of Milwaukee and State of Wisconsin, in the presence of two witnesses.

KARL BOS.

Witnesses:
   N. E. OLIPHANT,
   B. C. ROLOFF.